United States Patent
Delle et al.

(10) Patent No.: US 9,609,999 B2
(45) Date of Patent: Apr. 4, 2017

(54) DISHWASHER

(75) Inventors: Daniel Delle, Saragossa (ES); Bernd Hesterberg, Heidenheim (DE); Helmut Jerg, Giengen (DE); Kai Paintner, Adelsried (DE); Karlheinz Rehm, Dischingen Ortst. Trugenhofen (DE); Michael Rosenbauer, Reimlingen (DE)

(73) Assignee: BSH Hausgeräte GmbH, Munich (DE)

( * ) Notice: Subject to any disclaimer, the term of this patent is extended or adjusted under 35 U.S.C. 154(b) by 883 days.

(21) Appl. No.: 12/671,961

(22) PCT Filed: Aug. 21, 2008

(86) PCT No.: PCT/EP2008/060976
§ 371 (c)(1),
(2), (4) Date: Feb. 3, 2010

(87) PCT Pub. No.: WO2009/027320
PCT Pub. Date: Mar. 5, 2009

(65) Prior Publication Data
US 2011/0155179 A1    Jun. 30, 2011

(30) Foreign Application Priority Data
Aug. 31, 2007   (DE) .................. 10 2007 041 308

(51) Int. Cl.
*A47L 15/42*   (2006.01)
*A47L 15/00*   (2006.01)
*A47L 15/48*   (2006.01)

(52) U.S. Cl.
CPC ....... *A47L 15/4291* (2013.01); *A47L 15/4214* (2013.01); *A47L 15/0047* (2013.01); *A47L 15/481* (2013.01)

(58) Field of Classification Search
CPC ............ A47L 15/4291; A47L 15/4214; A47L 15/4246
USPC ........................... 135/108; 68/207, DIG. 902
See application file for complete search history.

(56) References Cited

U.S. PATENT DOCUMENTS

| | | | | |
|---|---|---|---|---|
| 2,514,050 A | * | 7/1950 | Grebe | 68/20 |
| 3,060,944 A | * | 10/1962 | Brollo | 134/58 D |
| 4,326,551 A | * | 4/1982 | Voorhees | 134/58 D |
| 4,529,032 A | * | 7/1985 | Molitor | 165/301 |

(Continued)

FOREIGN PATENT DOCUMENTS

| | | | |
|---|---|---|---|
| DE | 27 30 489 | * | 1/1979 |
| DE | 2730489 A1 | | 1/1979 |

(Continued)

OTHER PUBLICATIONS

European Patent Office 0 914 800 May 1999.*

(Continued)

*Primary Examiner* — Joseph L Perrin
*Assistant Examiner* — Kevin G Lee
(74) *Attorney, Agent, or Firm* — Michael E. Tschupp; Andre Pallapies

(57) ABSTRACT

A dishwasher that includes a treatment chamber in which items to be washed are supplied with washing liquor; a reservoir to exchange heat; feed lines to fill the reservoir with fresh water; outlet lines to direct a pre-heated contents of the reservoir into the treatment chamber; and a recycler to deliver the washing liquor from the treatment chamber into the reservoir.

35 Claims, 2 Drawing Sheets

(56) References Cited

U.S. PATENT DOCUMENTS

| | | | |
|---|---|---|---|
| 4,777,682 A * | 10/1988 | Dreher et al. | 8/158 |
| 5,617,885 A * | 4/1997 | Centis | 134/58 D |
| 5,829,459 A * | 11/1998 | Milocco et al. | 134/57 D |
| 2004/0035128 A1* | 2/2004 | Kaji et al. | 62/264 |
| 2006/0278257 A1* | 12/2006 | Jerg et al. | 134/56 D |
| 2007/0022789 A1* | 2/2007 | Heiligenmann et al. | 68/43 |
| 2007/0062670 A1* | 3/2007 | Radelet et al. | 165/45 |
| 2007/0234588 A1 | 10/2007 | Classen et al. | |
| 2007/0267048 A1 | 11/2007 | Eiermann et al. | |
| 2007/0277854 A1 | 12/2007 | Eiermann et al. | |

FOREIGN PATENT DOCUMENTS

| | | | | |
|---|---|---|---|---|
| DE | 2910140 A1 * | 9/1980 | | |
| DE | 30 21 746 * | 12/1981 | | |
| DE | 32 16 315 * | 11/1983 | | |
| DE | 39 00 617 * | 7/1990 | | |
| DE | 3905222 A1 * | 8/1990 | | D06F 39/006 |
| DE | 4233643 A1 * | 4/1994 | | |
| DE | 4243605 A1 | 6/1994 | | |
| DE | 29803527 * | 6/1999 | | |
| DE | 19758061 A1 * | 7/1999 | | |
| DE | 10355429 A1 * | 6/2005 | | A47L 15/4251 |
| DE | WO 2005063110 A2 * | 7/2005 | | A47L 15/4291 |
| FR | 2 464 688 * | 4/1981 | | |
| GB | 2 139 083 * | 11/1984 | | |
| GB | 2139083 A * | 11/1984 | | |
| GB | 2139084 A * | 11/1984 | | A47L 15/0023 |
| JP | 2006167347 A * | 6/2006 | | |

OTHER PUBLICATIONS

European Patent Office 0 691 099 Oct. 1996.*
Machine Translation of DE 2730489 A1, dated Jan. 1979.*
Machine translation of DE2910140A1, dated Sep. 1980.*
Machine translation of DE 29803527 U1, dated Jun. 1999.*
Machine translation of DE 4233643 A1, dated Apr. 1994.*
Machine translation of DE 19758061 A1, dated Jul. 1999.*
Machine translation of WO 2005063110 A2, dated Jul. 2005.*

* cited by examiner

DISHWASHER

BACKGROUND OF THE INVENTION

The invention relates to a dishwasher, in particular a domestic dishwasher, at least comprising a treatment chamber, in which items to be washed can be supplied with washing liquor and with a reservoir functioning as a heat exchanger, which can be filled with fresh water by means of feed lines and whose pre-heated contents can be directed into the treatment chamber by means of outlet lines.

A domestic dishwasher is known from DE 27 30 489, which has a reservoir functioning as a heat exchanger, which permits water held in the reservoir to be heated prior to use in a washing step, that is for the treatment of items to be washed. Here the heating can on the one hand take place by means of a temperature difference relative to the environment of the dishwasher and/or through waste heat from the washing liquor circulated in the treatment chamber. An energy saving can thereby be achieved.

BRIEF SUMMARY OF THE INVENTION

It is thus the object of the invention, as well as to reduce energy consumption also to cut water consumption. The object of the invention is achieved in that recycling means are provided for the delivery of washing liquor from the treatment chamber into the reservoir. The inventive dishwasher thus permits, in particular only slightly soiled washing liquor, such as for example water also provided with rinse-aid to be temporarily stored in the reservoir, for example after completion of a rinsing with rinse-aid process. Thus in the case of a renewed washing process stored, slightly soiled washing water is already available in the reservoir, in order for example to perform a pre-wash step, so that the water consumption is reduced.

It is preferably provided that the reservoir is arranged in heat-conducting contact with the heating chamber. Washing liquor stored in the reservoir can thus be pre-heated before its use in the treatment chamber by means of the waste heat from the treatment chamber, if the washing liquor circulated in the treatment chamber is heated.

It is further preferably provided that the reservoir is arranged in heat-conducting contact with an exterior wall of the dishwasher, so that it is further possible for the water held in the reservoir, which for example has been drawn from a domestic supply network, to be heated to the temperature of the dishwasher's environment, that is to room temperature for use in the dishwasher.

It is here preferably provided that the recycling means comprises at least a pump, with which the washing liquor can be delivered from the treatment chamber into the reservoir. This can here take the form of a pump embodied as a washing liquor pump and allow the washing liquor to be delivered out of the treatment chamber at the end of a washing process. To this end a line connecting the pump and the reservoir is provided, which in any case can be opened and closed by means of a valve, in order optionally to deliver washing liquor into the reservoir or into a water network by means of the washing liquor pump.

It is further preferably provided that the pump is connected with lines for the circulation of washing liquor in the treatment chamber, that is that the pump is embodied as a circulation pump, and during a cleaning step feeds the washing liquor collecting in the sump of a dishwasher via a line system to the spray arms arranged in the treatment chamber, which serve to effect the selective treatment of items to be washed with washing liquor.

It is further preferably provided that the recycling means comprise at least a return line, which connects the treatment chamber and the reservoir and which connects the treatment chamber and the tank with each other, so that it is ensured by simple means that washing liquor can be delivered from the treatment chamber into the reservoir and stored.

The line further preferably has a valve, with which the line can be opened and closed, so that in the case of an open line washing liquor can be delivered from the treatment chamber into the reservoir, while in the case of a closed valve, the pump output can be used for other purposes, for example to circulate washing liquor or pump out washing liquor.

In a preferred embodiment a drying system is provided to support the drying process provided at the end of a washing process, in order to dry items to be washed which are soaked with washing liquor. Drying systems of this kind are known to the person skilled in the art, and can be based on the introduction and/or extraction of air into or out of the treatment chamber, where in addition the heating device can be provided to heat the air. Drying systems are further known to persons skilled in the art, in which air is circulated from the treatment chamber in a closed circuit, where a heat exchanger can be provided for cooling purposes. However the drying device preferably has a heating device with a container with reversibly dehydratable material, in particular zeolite, through which the air from the treatment chamber can be drawn, so that the zeolite can absorb moisture. This allows exothermal absorption heat to be used for the drying of items to be washed. With the heating device in turn it is possible to dehydrate the zeolite by means of heating.

The invention further includes a method for the operation of a dishwasher,
in particular of a domestic dishwasher, in which items to be washed which are accommodated in a treatment chamber are supplied with washing liquor and in which in a reservoir functioning as a heat exchanger its contents are pre-heated. According to the invention it is here provided that washing liquor is delivered from the treatment chamber into the reservoir, that is that for example only slightly soiled washing liquor, is held available in the reservoir, for example at the end of a rinsing with rinse-aid step, for a further cleaning run and there assumes at least the room temperature of the environment of the dishwasher, so that both the water and energy consumption are reduced.

It is here preferably provided for the heating to take place passively, that is no energy-consuming heating devices are required.

In a preferred embodiment it is provided that the heating takes place through the transfer of ambient heat energy. Fresh water from a domestic supply system with a temperature of approx. 10 to 15° C. thus heats up to the room temperature prevailing in the room in which the dishwasher is set up.

In a further embodiment it is provided that the heating takes place by means of waste heat from the heated washing liquor. Heating beyond room temperature is thus possible.

It is here preferably provided that heating of the reservoir functioning as the heat exchanger takes place before treatment with washing liquor, that is through the ambient heat prevailing in the area surrounding the dishwasher.

It is further preferably provided that heating of the contents of the reservoir takes place during the treatment of items to be washed with washing liquor, that is water or washing liquor is temporarily stored in the reservoir functioning as a heat exchanger and is heated by the waste heat, which arises through the treatment of items to be washed with heated washing liquor.

In a preferred embodiment it is provided that washing liquor used for the rinsing of items to be washed is delivered into the reservoir, so that only slightly soiled water and/or water mixed with wetting agent is stored in the reservoir.

BRIEF DESCRIPTION OF THE DRAWINGS

The invention is explained below on the basis of a drawing, in which.

DETAILED DESCRIPTION OF EXEMPLARY EMBODIMENTS OF THE PRESENT INVENTION

Figure 1:
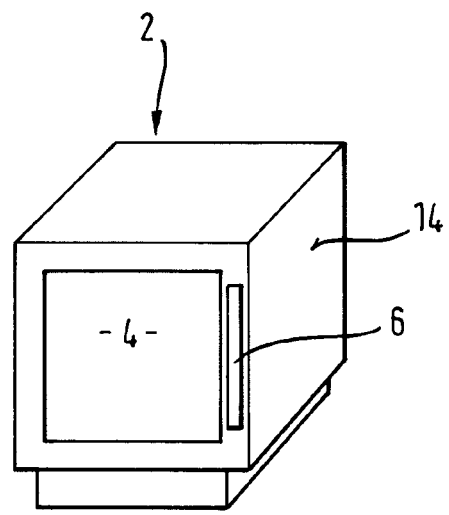
FIG. 1 shows a schematic representation of an inventive dishwasher.
Figure 2:
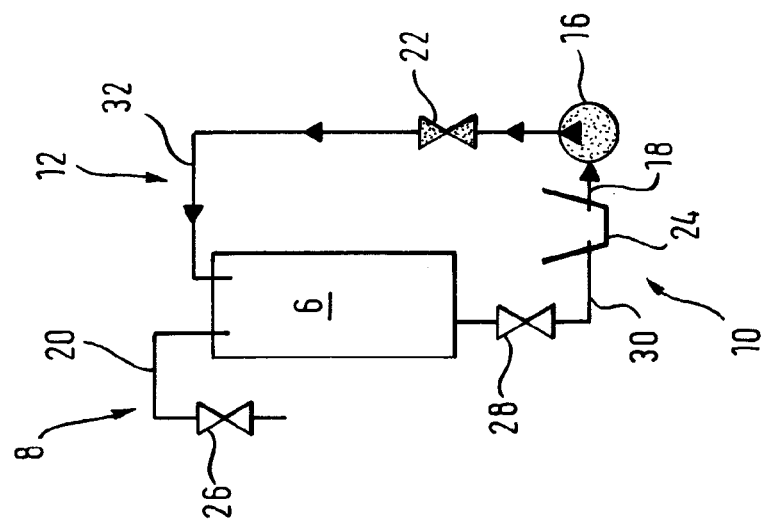
FIG. 2 shows a schematic representation of the mode of functioning of the device during filling with fresh water.
Figure 3:
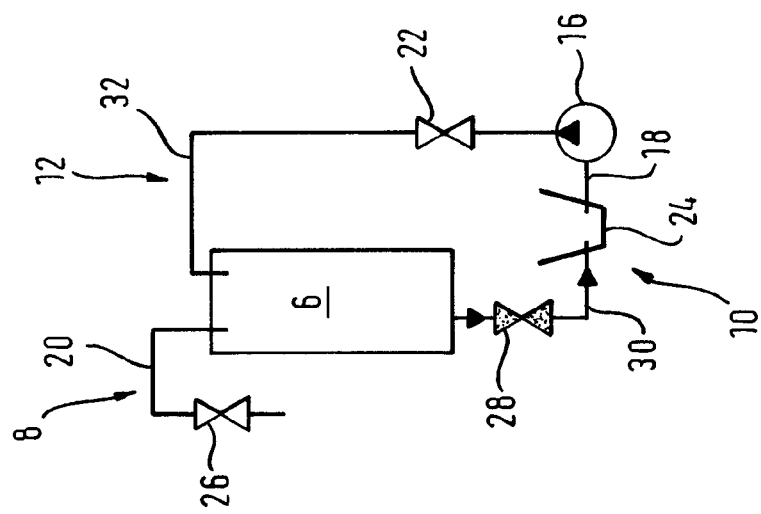
FIG. 3 shows a schematic representation of the mode of functioning of an inventive dishwasher during emptying of the reservoir.
Figure 4:
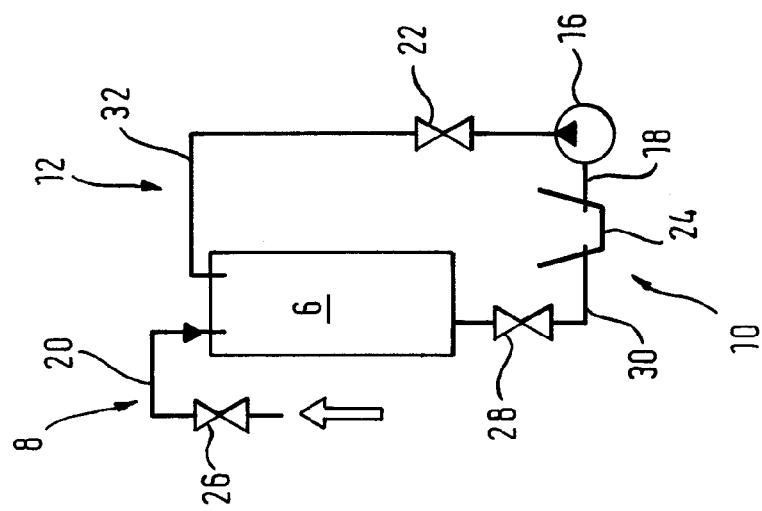
FIG. 4 shows a schematic representation of the mode of functioning of the invention during the filling of the reservoir with washing liquor.

Reference is made to FIGS. 1 to 4.

A domestic dishwasher 2 has in its interior a treatment chamber 4, which can be opened or closed by means of a door (not shown), in order to place in the interior of the treatment chamber 4 items to be washed (not shown) in crockery baskets (not shown) which are generally arranged as pull-out units. For treatment of the items to be washed arranged in the treatment chamber 4, the dishwasher has a hydraulic system (not shown), which has a circulation pump 16, with which washing liquid can be delivered to rotatably mounted spray arms (not shown) by means of lines of the hydraulic system, with which the items to be washed stacked in the crockery baskets can be supplied with washing liquor. The washing liquor collects in a sump 24 arranged in the base area of the treatment chamber 4, which is connected with the pump 16 in a fluid-connecting manner by means of a connection line 18.

The dishwasher 2 has a reservoir 6 functioning as a heat exchanger, which is arranged both adjacent to the treatment chamber 4 and also to an exterior wall 16 of the domestic dishwasher 2, so that the reservoir 6 functioning as a heat exchanger has a thermal contact with the exterior wall 14 of the dishwasher 2 and with the treatment chamber 4. This permits liquids, such as for example washing liquor or fresh water, to be temporarily stored or held available in the reservoir 6 functioning as a heat exchanger, where the liquid located in the reservoir 6 functioning as a heat exchanger is heated to the ambient temperature of the dishwasher 2, or if for example washing liquor heated in the treatment chamber 4 is circulated by means of its waste heat. A passive heating thus takes place without the use of heating devices.

The reservoir 6 is connected with supply means 8, which comprises a feed line 20, which is connected with a domestic supply network and allows the reservoir 6 to be filled with fresh water from the supply network. For the purposes of opening or closing, the supply means 8 comprises a water inlet valve 26, which can be actuated electromagnetically, and when required, for example at the start or at the end of a washing process, can be opened and closed by means of a controller (not shown) of the dishwasher 2.

For emptying of the reservoir 6 outlet lines 10 are provided, which comprises a discharge line 30, which establishes a liquid-conducting connection to the treatment chamber 4, for example to a sump 24 arranged in the base area of the treatment chamber 4. The discharge line 30 is here preferably arranged in a lower area of the reservoir 6, in such a way that a gravitationally-effected, autonomous emptying of the reservoir 6 is possible. The outlet line arrangement 10 further has a drain valve 28, which for example can be actuated electromagnetically and can when required, for example to initiate the changing change of washing liquor after completion of a first washing step, such as for example pre-wash, be opened or closed by means of the controller of the dishwasher, so that with the drain valve 28 open, the contents of the reservoir 6 flows into the sump 24 of the domestic dishwasher 2.

Recycling means 12 are further provided, which comprise a return line 32, which sets up a liquid-conducting connection from the sump 24 to the reservoir 6. The return line 32 can here be opened and closed by means of a washing liquor reservoir valve 22, which can for example be actuated electromagnetically and when required, for example in order to store washing liquor at the end of a washing step, can be opened and closed by the controller of the dishwasher 2.

The mode of functioning of the inventive domestic dishwasher 2 is explained below.

When the reservoir 6 is empty, for example when the domestic dishwasher 2 is put into operation for the first time after setup, upon starting of the domestic dishwasher 2 the reservoir 6 is filled by means of opening of the water inlet valve 26. Subsequently, the fresh water located in the reservoir 6 will heat up to room temperature during the course of a washing program of the domestic dishwasher, or be heated by waste heat from washing liquor circulated in the treatment chamber 4.

After a change of washing liquor, for example after a pre-wash step, the reservoir 6 is emptied by opening the drain valve 28, whereby the heated water flows out of the reservoir 6 into the sump 24 of the domestic dishwasher 2. Thereafter, the pre-heated water is circulated in the treatment chamber 4 through operation of the circulation pump 16, that is it is fed to the spray arms by a hydraulic system. After conclusion of this washing step the soiled washing liquor is delivered from the domestic dishwasher 2 into a domestic wastewater network (not shown) by means of a washing liquor pump (not shown).

In a final step, the rinsing of items to be washed arranged in the treatment chamber 4 takes place through the application of washing liquor mixed with wetting agent. The washing liquor mixed with wetting agent is likewise circulated with the aid of the circulation pump 16. After completion of this step, the washing liquor reservoir valve 22 is opened and the circulation pump separated from the hydraulic system supplying the spray arm, for example by means of a valve (not shown) or a water distributor (not shown). Alternatively, a bypass line (not shown) can also be provided. Then in the case of further driving of the pump 16, the washing liquor mixed with wetting agent is delivered into the reservoir 6 through the return line 32. After completion of this process, the pump 16 is deactivated and the washing liquor reservoir valve 22 closed once again, so that only washing liquor which is slightly soiled and only provided with wetting agent and which is already heated to the ambient temperature of the domestic dishwasher 2, is available for a later, subsequent washing process, so that in this way on the one hand energy consumption is reduced through the use of pre-heated washing liquor and on the other hand water consumption is cut through the recycling of washing liquor.

LIST OF REFERENCE CHARACTERS

2 Domestic dishwasher
4 Treatment chamber
6 Reservoir
8 Supply means
10 Outlet line arrangement
12 Recycling means
14 Exterior wall
16 Circulation pump
18 Connection line
20 Feed line
22 Washing liquor reservoir valve
24 Sump
26 Water inlet valve
28 Drain valve
30 Discharge line
32 Return line

The invention claimed is:

1. A dishwasher, comprising:
a treatment chamber;
an exterior wall that comprises substantially all of at least one exterior side of the dishwasher in thermal contact with an ambient room temperature;
a heat exchanger reservoir for holding and pre-heating liquid for use in a washing step, wherein the heat exchanger reservoir comprises a first side wall and a second side wall spaced apart therefrom, and substantially an entirety of an outer surface of the first side wall of the heat exchanger reservoir is arranged adjacent to an inner surface of the exterior wall of the dishwasher and substantially an entirety of an outer surface of the second side wall of the heat exchanger reservoir is arranged adjacent to an outer surface of the treatment chamber, and wherein the heat exchanger reservoir is adjacent to both the treatment chamber and the exterior wall of the dishwasher and in direct thermal contact with both, and the heat exchanger reservoir is configured such that liquid held in the heat exchanger reservoir is passively heated without the use of a heating device and cooled to substantially the ambient room temperature by heat transfer with the treatment chamber and with the ambient room temperature from the exterior wall during a washing program;
a reservoir feed line connected to the heat exchanger reservoir and a domestic supply network for filling the heat exchanger reservoir with fresh water from the domestic supply network, the reservoir feed line further comprising a water inlet valve;
a reservoir outlet line in liquid-conducting connection with the treatment chamber for directing pre-heated contents of the heat exchanger reservoir into the treatment chamber;
a return feed line connecting the treatment chamber and the heat exchanger reservoir for conveying washing liquor from the treatment chamber into the heat exchanger reservoir for storage, the return feed line further comprising a washing liquor return valve; and
a circulation pump, wherein the circulation pump is configured through its operation to circulate washing liquor in the treatment chamber and to also deliver washing liquor from the treatment chamber to the heat exchanger reservoir via the return line during respective steps of a wash program.

2. The dishwasher of claim 1, wherein the dishwasher is a domestic dishwasher.

3. The dishwasher of claim 1, further comprising a hydraulic system having lines to circulate the washing liquor in the treatment chamber, wherein the circulation pump is connected with the lines of the hydraulic system.

4. The dishwasher of claim 1, further comprising a drying device to dry items to be washed in the treatment chamber.

5. The dishwasher of claim 4, wherein the drying device has a heating device including a container with reversibly dehydratable material, wherein air from the treatment chamber is directed through the heating device.

6. The dishwasher of claim 5, wherein the reversibly dehydratable material is zeolite.

7. The dishwasher of claim 1, wherein the reservoir feed line feeds the heat exchanger reservoir with fresh water.

8. The dishwasher of claim 1, comprising a plurality of reservoir feed lines.

9. The dishwasher of claim 1, wherein the reservoir outlet line directs pre-heated contents of the heat exchanger reservoir into the treatment chamber.

10. The dishwasher of claim 1, comprising an outlet line arrangement in liquid-conducting connection with the treatment chamber.

11. The dishwasher of claim 1, wherein the washing liquor delivered from the treatment chamber into the heat exchanger reservoir comprises slightly soiled washing liquor.

12. The dishwasher of claim 1, wherein the washing liquor delivered from the treatment chamber into the heat exchanger reservoir comprises washing liquor mixed with a wetting agent.

13. The dishwasher of claim 1, wherein the washing liquor delivered from the treatment chamber into the heat exchanger reservoir comprises rinse fluid from a rinse step.

14. The dishwasher of claim 1, wherein the washing liquor delivered from the treatment chamber into the heat exchanger reservoir is for use in a further cleaning run.

15. The dishwasher of claim 14, wherein the further cleaning run comprises a pre-wash step.

16. The dishwasher of claim 1, wherein the washing liquor delivered from the treatment chamber into the heat exchanger reservoir assumes at least room temperature of the environment of the dishwasher.

17. The dishwasher of claim 1, wherein the entirety of the first side of the heat exchanger reservoir is arranged adjacent to the exterior wall of the dishwasher.

18. A method to operate a dishwasher, comprising:
supplying items to be washed that are accommodated in a treatment chamber of a dishwasher with washing liquor, wherein the dishwasher comprises;
the treatment chamber;
an exterior wall that comprises substantially all of at least one exterior side of the dishwasher in thermal contact with an ambient room temperature;
a heat exchanger reservoir for holding and pre-heating liquid for use in a washing step, wherein the heat exchanger reservoir comprises a first side wall and a second side wall spaced apart therefrom, and substantially an entirety of an outer surface of the first side wall of the heat exchanger reservoir is arranged adjacent to an inner surface of the exterior wall of the dishwasher and substantially an entirety of an outer surface of the second side wall of the heat exchanger reservoir is arranged adjacent to an outer surface of the treatment chamber, and wherein the heat exchanger reservoir is adjacent to both the treatment chamber and the exterior wall of the dishwasher and in direct thermal contact with both, and the heat exchanger reservoir is configured such that liquid held in the heat exchanger reservoir is passively heated without the use of a heating device and cooled to substantially the ambient room temperature by heat transfer with the treatment chamber and with the ambient room temperature from the exterior wall during a washing program;

a reservoir feed line connected to the heat exchanger reservoir and a domestic supply network for filling the heat exchanger reservoir with fresh water from the domestic supply network, the reservoir feed line further comprising a water inlet valve;

a reservoir outlet line in liquid-conducting connection with the treatment chamber for directing pre-heated contents of the heat exchanger reservoir into the treatment chamber;

a return feed line connecting the treatment chamber and the heat exchanger reservoir for conveying washing liquor from the treatment chamber into the heat exchanger reservoir for storage, the return feed line further comprising a washing liquor return valve; and a circulation pump, wherein the circulation pump is configured through its operation to circulate washing liquor in the treatment chamber and to also deliver washing liquor from the treatment chamber to the heat exchanger reservoir via the return line during respective steps of a wash program;

pre-heating the liquid contents of the heat exchanger reservoir; and delivering the washing liquor from the treatment chamber into the heat exchanger reservoir.

19. The method of claim 18, wherein the dishwasher is a domestic dishwasher.

20. The method of claim 18, wherein the contents of the heat exchanger reservoir is passively pre-heated.

21. The method of claim 20, wherein the passive pre-heating of the contents of the heat exchanger reservoir takes place through transfer of ambient heat energy.

22. The method of claim 20, wherein the passive pre-heating of the contents of the heat exchanger reservoir takes place before the items to be washed are supplied with the washing liquor.

23. The method of claim 20, wherein the passive pre-heating of the contents of the heat exchanger reservoir takes place during treatment of the items to be washed with the washing liquor.

24. The method of claim 18, wherein the washing liquor is mixed with a wetting agent, and wherein the washing liquor mixed with the wetting agent is delivered into the heat exchanger reservoir.

25. A method to operate a dishwasher, comprising:
providing a dishwasher, comprising:
a treatment chamber;
an exterior wall that comprises substantially all of at least one exterior side of the dishwasher in thermal contact with an ambient room temperature;
a heat exchanger reservoir for holding and pre-heating liquid for use in a washing step, wherein the heat exchanger reservoir comprises a first side wall and a second side wall spaced apart therefrom, and substantially an entirety of an outer surface of the first side wall of the heat exchanger reservoir is arranged adjacent to an inner surface of the exterior wall of the dishwasher and substantially an entirety of an outer surface of the second side wall of the heat exchanger reservoir is arranged adjacent to an outer surface of the treatment chamber, and wherein the heat exchanger reservoir is adjacent to both the treatment chamber and the exterior wall of the dishwasher and in direct thermal contact with both, and the heat exchanger reservoir is configured such that liquid held in the heat exchanger reservoir is passively heated without the use of a heating device and cooled to substantially the ambient room temperature by heat transfer with the treatment chamber and with the ambient room temperature from the exterior wall during a washing program;

a reservoir feed line connected to the heat exchanger reservoir and a domestic supply network for filling the heat exchanger reservoir with fresh water from the domestic supply network, the reservoir feed line further comprising a water inlet valve;

a reservoir outlet line in liquid-conducting connection with the treatment chamber for directing pre-heated contents of the heat exchanger reservoir into the treatment chamber;

a return feed line connecting the treatment chamber and the heat exchanger reservoir for conveying washing liquor from the treatment chamber into the heat exchanger reservoir for storage, the return feed line further comprising a washing liquor return valve; and a circulation pump, wherein the circulation pump is configured through its operation to circulate washing liquor in the treatment chamber and to also deliver washing liquor from the treatment chamber to the heat exchanger reservoir via the return line during respective steps of a wash program;

pre-heating contents of the heat exchanger reservoir; and delivering washing liquor from the treatment chamber into the heat exchanger reservoir.

26. The method of claim 25, wherein the dishwasher is a domestic dishwasher.

27. The method of claim 25, wherein the contents of the heat exchanger reservoir is passively pre-heated.

28. The method of claim 27, wherein the passive pre-heating of the contents of the heat exchanger reservoir takes place through transfer of ambient heat energy.

29. The method of claim 27, wherein the passive pre-heating of the contents of the heat exchanger reservoir takes place before the items to be washed are supplied with the washing liquor.

30. The method of claim 27, wherein the passive pre-heating of the contents of the heat exchanger reservoir takes place during treatment of the items to be washed with the washing liquor.

31. The method of claim 25, wherein the washing liquor is mixed with a wetting agent, and wherein the washing liquor mixed with the wetting agent is delivered into the heat exchanger reservoir.

32. The method of claim 25, wherein the washing liquor is delivered from the treatment chamber into the heat exchanger reservoir following a rinse step.

33. The method of claim 25, wherein the washing liquor delivered from the treatment chamber into the heat exchanger reservoir is for use in a further cleaning run.

34. The method of claim 33, wherein the further cleaning run comprises a pre-wash step.

35. The method of claim 25, wherein the washing liquor delivered from the treatment chamber into the heat exchanger reservoir assumes at least room temperature of the environment of the dishwasher.

\* \* \* \* \*